United States Patent
Lin

(10) Patent No.: US 7,623,429 B2
(45) Date of Patent: Nov. 24, 2009

(54) METHOD FOR THE RECOVERY OF A DAMAGED TABLE OF CONTENTS IN AN OPTICAL DISC

(75) Inventor: Tai-Liang Lin, Keelung (TW)

(73) Assignee: Mediatek Inc., Hsin-Chu (TW)

( * ) Notice: Subject to any disclaimer, the term of this patent is extended or adjusted under 35 U.S.C. 154(b) by 495 days.

(21) Appl. No.: 11/681,747

(22) Filed: Mar. 2, 2007

(65) Prior Publication Data

US 2007/0258340 A1 Nov. 8, 2007

Related U.S. Application Data

(60) Provisional application No. 60/743,788, filed on Mar. 27, 2006.

(51) Int. Cl.
*G11B 15/04* (2006.01)
(52) U.S. Cl. .................... 369/53.2; 369/30.03
(58) Field of Classification Search ........................ None
See application file for complete search history.

(56) References Cited

U.S. PATENT DOCUMENTS 5,734,787 A * 3/1998 Yonemitsu et al. .......... 386/111
2004/0179435 A1* 9/2004 Kato ....................... 369/30.03

* cited by examiner

*Primary Examiner*—Paul Huber
(74) *Attorney, Agent, or Firm*—Winston Hsu

(57) ABSTRACT

A method for generating a recovered table of contents (TOC) for an optical disc having an damaged TOC and a predetermined file system includes selecting a recovering session on the optical disc; determining a recovering session starting location corresponding to a first SRR starting location in the recovering session; determining if the recovering session is a closed session; and if the recovering session is a closed session: determining a data size of the recovering session; calculating a next session starting location immediately following the recovering session by adding the data size of the recovering session, a temp-leadout size of the recovering session, and a temp-leadin size of the next session to the recovering session starting location; and constructing the recovered TOC by including information of recovering session and the next session starting location.

21 Claims, 3 Drawing Sheets

METHOD FOR THE RECOVERY OF A DAMAGED TABLE OF CONTENTS IN AN OPTICAL DISC

CROSS REFERENCE TO RELATED APPLICATIONS

This application gains the benefit of U.S. priority Patent Application No. US60/743,788, which was filed on Mar. 27, 2006 and is included herein by reference.

BACKGROUND OF THE INVENTION

1. Field of the Invention

The present invention relates to optical devices, and more particularly, to a method for the recovery of a damaged table of contents (TOC) in an optical disc.

2. Description of the Prior Art

Recordable optical discs provide a portable, affordable, and flexible format in which a user can store and transport data. Some of the common optical disc formats today include BD (Blue ray discs), HD-DVD (High Density DVD discs), DVD, and CD. Although there are several formats of optical disc types on the market, most share similar characteristics and structures. Burning of recordable disc is usually performed in sessions (For HD-DVD and DVD-R, "session" is also referred as "Border"). The sessions can either be open—indicating that further data can be stored within the session, or closed, meaning that no further data can be added to the session. No more than one open session can exist on a single optical disc, and only the last session on the disc can have the possibly of being the open session.

Surrounding each session is a temp-leadin area and temp-leadout area. The temp-lead-in area precedes the session recording, and the temp-lead-out area follows the session. Generally, these areas provide a buffer area between subsequent sessions (however for BD-R, there is no temp-lead-in and temp-lead-out surrounding for each session). Each closed session should contain a file system for management of data within each session. Before the current using session is closed, a host system will write file system data into these areas to convey file distribution information for management purposes according to the file system specification. Common file system specifications include Universal Disc format (UDF) and ISO09660 for various types of optical disc formats.

The sessions of the optical disc are further divided into segments for which specific data is stored into. Depending on the type of optical disc used, the segment is referred to by a specific name. For BD discs, the segment is called an SRR, for DVD+R discs it is called a fragment, for HD-DVD-R discs and DVD-R discs it is called a recording zone (Rzone), and for CDRs it is called a track. In order to simplify the discussion to follow, the term SRR will simply be used to refer to all the above segment types. It should also be noted that a session can contain multiple SRRs.

Information regarding each individual session (including distribution and status), and their SRRs, are contained within a table of contents (TOC). According to the physical specification of the disc, its TOC possesses a reference location of each session and data format of the disc. The data of the TOC is stored in a TDMA area or DMA area with SRRI format for BD-R discs, the TOC Zone with SDCB format for DVD+R discs, the RMD area with RMD format for HD-DVD-R and DVD-R discs, and stored in PMA area with TOC format for CD-R discs.

In the case of sequential recording, the TOC also provides the disc drive a location corresponding to the first SRR starting location in the last open session. This location can be used to determine a starting location in a following open session for continuation of recording if desired.

When a host system or computer wants to access an optical disc, it must first request the disc drive to read the TOC. After reading the TOC, the disc drive can return the TOC reference information to the host. The host can then identify session and SRR data through parsing the requested TOC information. Critical information includes the start location (the start location of a certain session corresponds to the start location of the first SRR of the certain session in this application) of the first session, the start location of the last closed session, and the start location of the last open session. These start locations are used as references in subsequent reading and writing operations performed on the disc.

Occasionally, an optical disc drive may be incapable of reading the TOC of the optical disc due to recording defects, scratches on the disc surface, or dust interfering with a laser of the disc drive. If this happens, the disc drive will not be capable of accessing certain data (or sessions) within the optical disc. The disc drive will also respond to the requesting host with an error message indicating its inability to read the TOC. Depending on the damaged or unreadable area(s) in the TOC, the drive may not be able to reference and read certain areas in the disc. Furthermore the host may not be able to receive the latest updated TOC information, and will therefore be unable to properly perform subsequent writing and reading operations on the disc without a reference for the last closed session.

SUMMARY OF THE INVENTION

One objective of the claimed invention is therefore to construct a recovered table of contents from a completely or partially damaged table of contents in order to solve the above-mentioned problems.

A method for generating a recovered table of contents (TOC) for an optical disc having a damaged TOC and a predetermined file system is disclosed. The method includes selecting a recovering session on the optical disc; determining a recovering session starting location corresponding to a first SRR starting location in the recovering session; determining if the recovering session is a closed session; and if the recovering session is a closed session: determining a data size of the recovering session by parsing volume information of file system; calculating a next session starting location immediately following the recovering session by adding the data size of the recovering session, a temp-leadout size of the recovering session, and a temp-leadin size of the next session to the recovering session starting location; and constructing the recovered TOC by including information of the recovering session and the next session starting location.

According to another exemplary embodiment of the claimed invention, a method is disclosed for generating a recovered table of contents (TOC) for an optical disc having an damaged TOC and a predetermined file system, the method comprising iteratively performing the following steps: a) selecting a recovering session on the optical disc; b) determining a recovering session starting location corresponding to a first SRR starting location in the recovering session; c) determining if the recovering session is a closed session; and if the recovering session is a closed session, d) determining a data size of the recovering session by parsing volume information of file system; e) calculating a next session starting location immediately following the recovering session by adding the data size of the recovering session, a temp-leadout size of the recovering session, and a temp-leadin size of the next session to the recovering session starting location; f) constructing the recovered TOC by including information of the recovering session and the next session starting location; and g) selecting the next session as the recovering session and determining the next session starting location as the recovering session starting location of the recovering session for a next iteration.

These and other objectives of the present invention will no doubt become obvious to those of ordinary skill in the art after reading the following detailed description of the preferred embodiment that is illustrated in the various figures and drawings.

DETAILED DESCRIPTION

Currently, there are no commonly known methods for recovery of a damaged or unreadable TOC. Costs of optical discs are typically low enough that if a recording defect were to occur, one could simply repeat a recording on an alternate disc and discard the defective disc. However, if the source data recorded onto the disc is for some reason no longer available, one may want to recover the TOC of a damaged disc as it may be the only current source of the desired data.

If a TOC area is found damaged or unreadable, the disc drive may not be able to read and access certain data stored within the disc. Also a host system may not be able to receive the latest updated TOC information to get starting location of the last closed session for reading and starting location of the last open session for subsequent writing procedures. Therefore, further information cannot be stored onto the disc regardless of whether its full capacity has been reached. In order to solve this problem, the present invention provides a method to recover a damaged or unreadable original TOC.

The present invention utilizes obtainable information from the file system of the disc to reconstruct a replacement TOC, which can be used for reference in subsequent host operations. If the recording is accessible by the drive, the drive can also record the reconstructed TOC onto the disc to replace the damaged TOC. Use of the reconstructed TOC will allow the host to retrieve data and possibly write data to the disc, as it would otherwise be unable to do with a damaged TOC. Proper operation can be resumed with the optical disc, and a user can continue to access and use a disc as desired.

The present invention makes use of the file system, contained in the optical disc to for the management data within each session. Checking the existence of the indicators of the file system shows whether a session has been closed or is still open for recording. Closed recording sessions cannot be recorded with any data or have further SRRs stored in them, whereas open sessions can accommodate further SRRs. The file system also contains the volume of each session, which indicates the space utilized by each session. Using the volume of a specific session, the present invention further deduces the data size of a recovering session in accordance to the specification of the file system.

For certain types of file systems, the volume size of a specific session equals the data size for the session. Under other file system types, the volume size represents the data size from the starting location of the first session up to and including the current session. As part of the present invention method, the volume size of a certain closed session is used to derive a data size for the same closed session, which is in turn used to determine the starting location of the next session as part of the recovering TOC reconstruction process.

Figure 1:
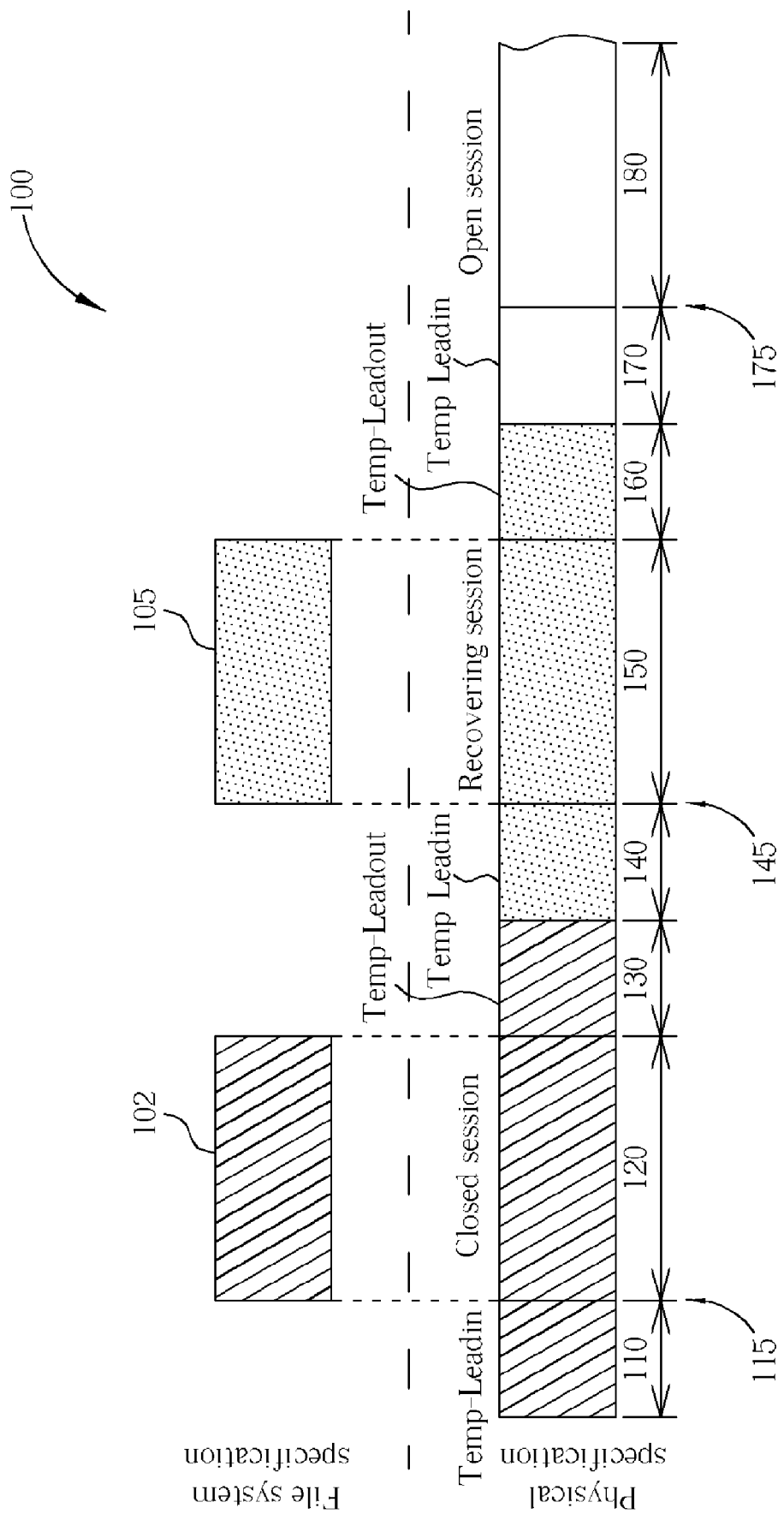
FIG. 1 illustrates a sample sequential session layout of an optical disc.

An embodiment of the method for the recovery of a damaged TOC in an optical disc according to the present invention is illustrated through FIG. 1. FIG. 1 illustrates a sample sequential session layout 100 of an optical disc. The layout 100 includes a closed session 120, surrounded by temp-leadin area 110 and temp-leadout area 130 for the closed session 120. The closed session 120 has a starting location 115 following temp-leadin area 110. The next session is a recovering session 150 with starting location 145. The recovering session 150 is surrounded by temp-leadin area 140 and temp-leadout area 160. Following the recovering session 150, is a temp-leadin area 170 for an open session, starting location 175 for the open session, and the open session 180. The file system for the optical disc also provides a volume size 102 corresponding to closed session 120, and volume size 105 corresponding to recovering session 150.

In this example, the recovering session 150 is also a closed session. However, we assume that the TOC is damaged so that it only identifies closed session 120 as a closed session, with everything following the closed session 120 assumed in error to be an open session. Therefore, the originally damaged and partially discernible TOC provides the starting location 115 of closed session 120, as well as starting location 145 assumed to be an open session starting location. In this case, it is desirable to find the starting location of subsequent sessions until the last (open) session has been found and confirmed to indicate the ending of data stored on the disc. The starting locations found for the various sessions can then be used to construct a recovered TOC.

Again, when read by the disc drive, the recovering session 150 is initially assumed to be an open session through the partially discernible TOC due to damage or a recording defect. The partially discernible TOC also reveals recovering session 150 having a starting location 145, which follows the last detectable closed session 120. A determination is then made to confirm whether the recovering session 150 is indeed open or closed. An indicator from the file system corresponding to the recovering session 150 is then checked to confirm the status of the session. In this case, the indicator will confirm the recovering session 150 as being a closed session. Therefore, it is desirable to advance to the next (currently unknown) starting location of the following session to provide additional starting points for complete TOC reconstruction.

Now that recovering session 150 is confirmed as a closed session through the file system, the method proceeds to locate the starting location of the next session. This is done by first determining the data size of the recovering session 150. The data size is then added to the temp-leadout area 160 of the recovering session, and the temp-leadin area 170 of the open session. The temp-leadout area 160 and temp-leadin area 170 are also provided through the physical specification of their respective sessions. The sum of these three values will provide a relative reference beyond the starting location 145 of the recovering session to indicate where the next session starting location exists. Simply put, the starting location 175 of the following session equals the starting location 145 of the recovering session, plus the data size of the recovering session 150, plus the temp-leadout size 160 of the recovering session, plus the temp-leadin size 170 of the following session.

The data size of the recovering session 150 is determined from to the volume size 105 of the recovering session 150 according to the file system. Depending on the specific file system, the volume size 105 may be scaled equaling the data size for a specific session, or may equal the data size from the start location of first session up to and including the specific session. For the latter case, one would simply subtract the starting location 145 of the recovering session 150 from its volume size 105 to attain a scaled data size for the recovering session 150.

With a proper data size of the recovering session 150 now deduced, the temp-leadout area 160 of the recovering session 150, and temp-leadin area 170 of the open session 180 are simply added to the data size and the starting location 145. This provides an absolute starting location 175 of the next (open) session. The information (Data size) of recovering session 150 and starting location 175 of the open session can then be added to the recovering TOC as part of the recovery process. The method will then check an identifier from the file system of the open session 180, from which it can confirm its status as an open/closed session. In this case, open session 180 is indeed open, and the method has successfully completed reconstruction of the recovered TOC from the original TOC which may be damaged.

If an open session was not confirmed in the previous step, the method would then advance to the next session through determining the data size of the current session (open session 180), and similarly calculate the starting point of the following session (not shown) through the above process until an open session is confirmed.

Using the above described method, it is not necessary to perform additional recording or use additional information outside of the existing physical and file system specification of the optical disc to recover a damaged TOC. Only the conforming physical specification of the disc, and the file system specification is needed to advance between adjacent sessions and determine starting points for each session in recovery of the TOC.

The above example illustrates a case where the open session immediately follows the first selected recovering session. In practice however, this may not be the case. Therefore, a further embodiment of the present invention further includes iteratively performing the above detailed process for adjacent sessions on the optical disc in an increasing order until the recovering session is an open session. In this way, the process continues and identifies starting locations for every session until the open session is located.

In the case that the TOC is totally indiscernible or unreadable, one may wish to begin the above process from the start of disc data. An alternate embodiment of the present invention described above can therefore select the first session on the optical disc as the recovering session and determining the starting location of the first session according to a starting location of user data of disc. In this way, the first session becomes the recovering session, and each session recovery process above can be conducted in sequence until the last open session is determined. Also, the session immediately following the last discernible closed session according to the original TOC can be selected as the recovering session in yet another embodiment. This would promote efficiency in the recovery process, as already identified starting locations in the original TOC would not need to be unnecessarily recovered.

Figure 2:
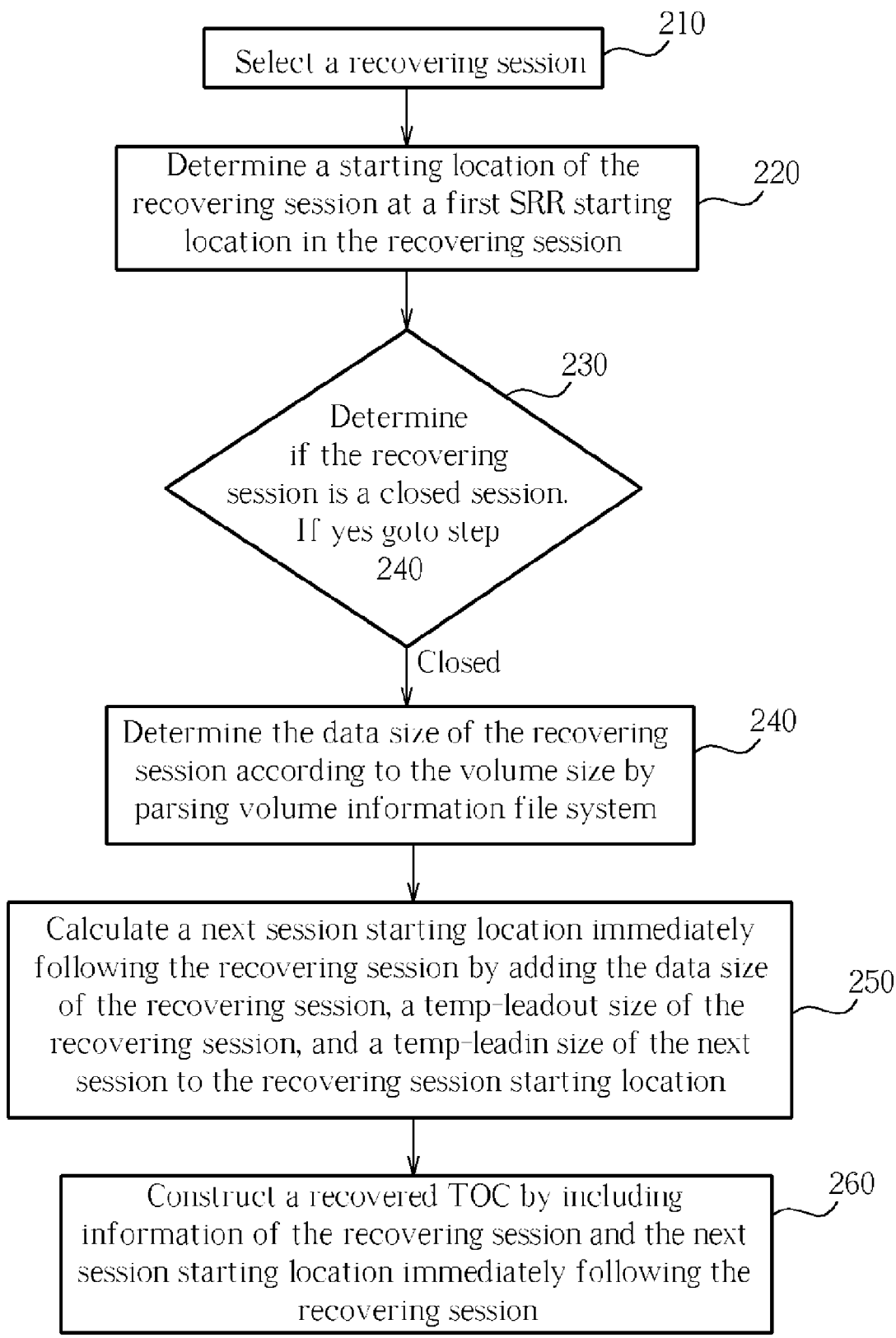
FIG. 2. is a flow chart illustrating an embodiment of the method of the present invention.

FIG. 2. is a flow chart 200 illustrating an embodiment of the method of the present invention. Provided that substantially the same result is achieved, the steps of the process 200 need not be in the exact order shown and need not be contiguous, that is, other steps can be intermediate. The method is described in the following:

Step 210: Select a recovering session on the optical disc.

Step 220: Determine a starting location of the recovering session corresponding to a first SSR starting location in the recovering session.

Step 230: Determine if the recovering session is a closed session by checking the existence of indicator of the file system corresponding to the recovering session. If the recovering session is a closed session, go to step 240

Step 240: Determine the data size of the recovering session according to the volume size of the recovering session by parsing volume information of file system.

Step 250: Calculate a next session starting location immediately following the recovering session by adding the data size of the recovering session, a temp-leadout size of the recovering session, and a temp-leadin size of the next session to the recovering session starting location.

Step 260: Construct a recovered TOC by including information of the recovering session and the next session starting location immediately following the recovering session.

Figure 3:
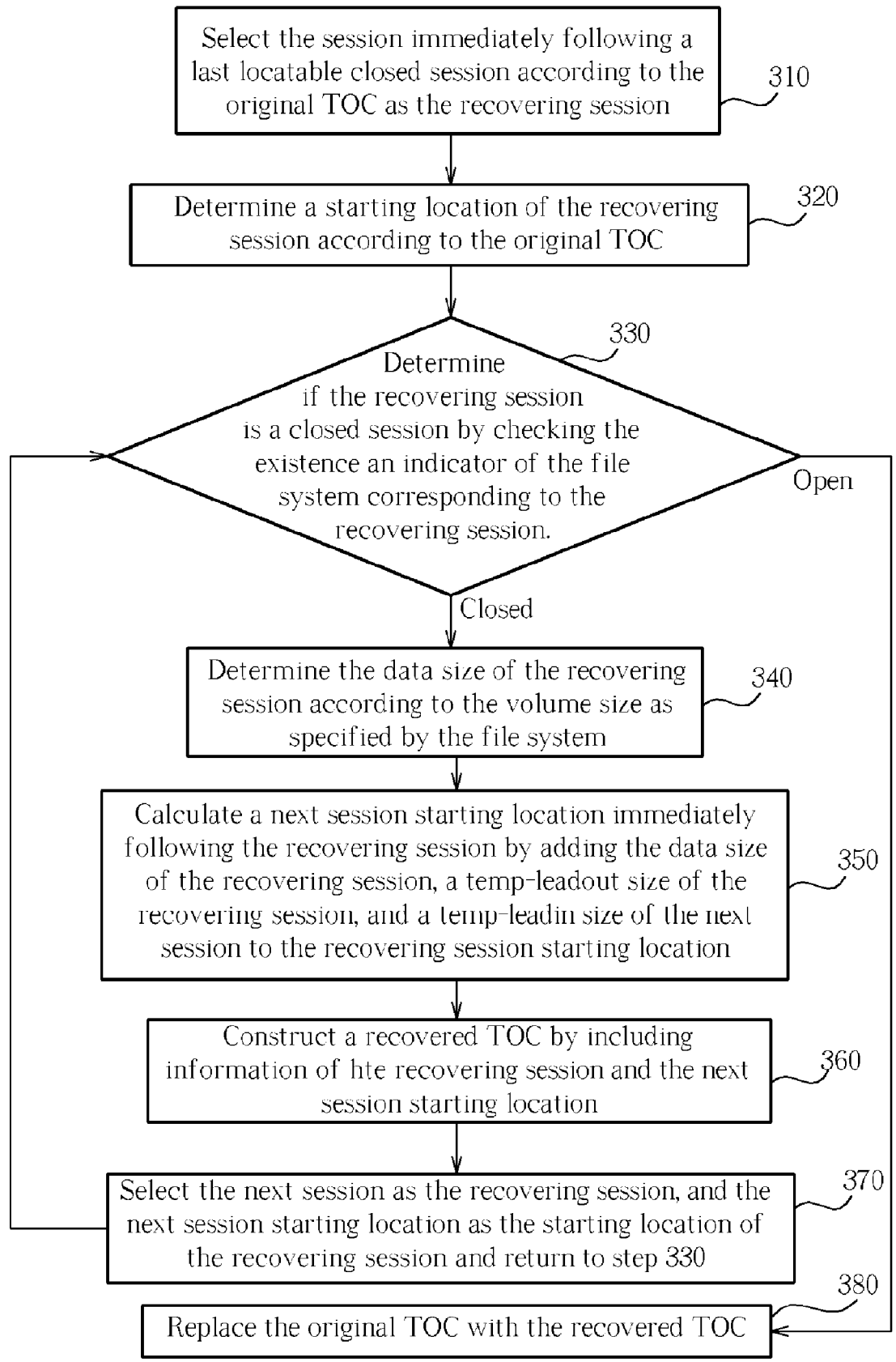
FIG. 3. is a flow chart illustrating a preferred embodiment of the method of the present invention.

FIG. 3. is a flow chart 300 illustrating a preferred embodiment of the method of the present invention. Provided that substantially the same result is achieved, the steps of the process 300 need not be in the exact order shown and need not be contiguous, that is, other steps can be intermediate. The method is described in the following:

Step 310: Select the session immediately following a last locatable closed session according to the original TOC as the recovering session.

Step 320: Determine a starting location of the recovering session according to the original TOC.

Step 330: Determine if the recovering session is a closed session by checking the existence of indicator of the file system corresponding to the recovering session. If the recovering session is a closed session, go to step 340. Otherwise go to step 380.

Step 340: Determine the data size of the recovering session according to the volume size of the recovering session as specified by the file system.

Step 350: Calculate a next session starting location immediately following the recovering session by adding the data size of the recovering session, a temp-leadout size of the recovering session, and a temp-leadin size of the next session to the recovering session starting location.

Step 360: Construct a recovered TOC by including information of the recovering session and the next session starting location Step 370: Select the next session as the recovering session, and the next session starting location as the starting location of the recovering session and return to step 330.

Step 380: Replace the original TOC with the recovered TOC.

Using the above-described process, the present invention provides a method to recover a damaged or unreadable table of contents in an optical disc. In the event an optical disc has its table of contents physically scratched or damaged, or the table of contents is unreadable by a disc drive, the present invention method can generate a recovered table of contents based on the original table of contents to allow the accessing and writing of data onto the disc as desired by a user. This is accomplished in large part by referral to the file system of the optical disc, and use of potentially readable areas of the table of contents. In this way, the present invention method deduces starting points for any indiscernible session(s) in the original table of contents, which can then be added to the recovered table of contents. If possible, the recovered table of contents can then replace the damaged table of contents on the optical disc to allow a host to access the disc without further problems or errors. Even if it not possible to replace the damaged table of contents on the optical disc, a host system can still utilize the information of the recovered table of contents to access all sessions on the optical disc.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for generating a recovered table of contents (TOC) for an optical disc having an original TOC and a predetermined file system, the method comprising:
    selecting a recovering session on the optical disc;
    determining a recovering session starting location corresponding to a first SRR starting location in the recovering session;
    determining if the recovering session is a closed session; and
    if the recovering session is a closed session:
        determining a data size of the recovering session;
        calculating a next session starting location immediately following the recovering session by adding the data size of the recovering session, a temp-leadout size of the recovering session, and a temp-leadin size of the next session to the recovering session starting location; and
        constructing the recovered TOC by including information of the recovering session and the next session starting location.

2. The method of claim 1 further comprising:
    selecting a first session on the optical disc as the recovering session; and
    determining the starting location according to a starting location of user data of the optical disc.

3. The method of claim 1 wherein the original TOC is damaged, partially discernible, or unreadable with an optical drive.

4. The method of claim 3 further comprising:
    selecting the recovering session as a session immediately following a last locatable closed session according to the original TOC; and
    determining the recovering session starting location according to the original TOC.

5. The method of claim 1 further comprising constructing the recovered TOC by including the recovering session starting location if the recovering session is an open session.

6. The method of claim 1 further comprising if the recovering session is a closed session:
    determining if the next session is a closed session; and
    if the next session is a closed session:
        determining a data size of the next session according to a volume size of the next session specified by the file system;
        calculating a subsequent session starting location corresponding to a first SRR starting location in a session immediately following the next session by adding the data size of the next session, a temp-leadout size of the next session, and a temp-leadin size of the subsequent session to the next session starting location; and
        constructing the recovered TOC by including information of the recovering session and the subsequent session starting location.

7. The method of claim 1 being iteratively performed for adjacent sessions on the optical disc in an increasing order until the recovering session is an open session.

8. The method of claim 1 further comprising if the recovering session is a closed session, utilizing the volume size of the recovering session specified by the file system as the data size of the recovering session.

9. The method of claim 1 further comprising if the recovering session is a closed session, utilizing the volume size of the recovering session as specified by the file system subtracted by the starting location of the recovering session as the data size of the recovering session.

10. The method of claim 1 further comprising replacing the original TOC with the recovered TOC.

11. The method of claim 1 wherein an indicator of the predetermined file system corresponding to the recovering session is used to determine if the recovering session is a closed session.

12. The method of claim 1 wherein the predetermined file system is UDF.

13. The method of claim 1 wherein the predetermined file system is ISO9660.

14. A method for generating a recovered table of contents (TOC) for an optical disc having an original TOC and a predetermined file system, the method comprising iteratively performing the following steps:
    a) selecting a recovering session on the optical disc;
    b) determining a recovering session starting location corresponding to a first SRR starting location in the recovering session;
    c) determining if the recovering session is a closed session; and
    if the recovering session is a closed session,
        d) determining a data size of the recovering session;
        e) calculating a next session starting location corresponding to a first SRR starting location in a next session immediately following the recovering session by adding the data size of the recovering session, a temp-leadout size of the recovering session, and a temp-leadin size of the next session to the recovering session starting location;
        f) constructing the recovered TOC by including information of the recovering session and the next session starting location; and
        g) selecting the next session as the recovering session and determining the next session starting location as the recovering session starting location of the recovering session for a next iteration.

15. The method of claim 14 wherein step a) further comprises selecting a first session on the optical disc as the recovering session; and step b) further comprises determining the starting location according to a starting location of user data of the optical disc.

16. The method of claim 14 wherein the original TOC is damaged, partially discernible, or unreadable with an optical drive.

17. The method of claim 16 wherein step a) further comprises selecting the recovering session as a session immediately following a last locatable closed session according to the original TOC; and step b) further comprises determining the starting location according to the original TOC.

18. The method of claim 14 wherein step d) further comprises utilizing the volume size of the recovering session specified by the file system as the data size of the recovering session.

19. The method of claim 14 wherein step d) further comprises utilizing the volume size of the recovering session as specified by the file system subtracted by the starting location of the recovering session as the data size of the recovering session.

20. The method of claim 14 wherein step c) further comprises utilizing an indicator of the predetermined file system corresponding to the recovering session to determine if the recovering session is a closed session.

21. The method of claim 14 further comprising replacing the original TOC with the recovered TOC if the recovering session is an open session.

* * * * *